(12) United States Patent
Saraf et al.

(10) Patent No.: US 12,393,446 B2
(45) Date of Patent: Aug. 19, 2025

(54) CLOUD TRIGGERS FOR SCHEDULING ROBOTS

(71) Applicant: UiPath, Inc., New York, NY (US)

(72) Inventors: Ankit Saraf, Bellevue, WA (US); Andrew Hall, Charlottesville, VA (US); Remus Rusanu, Redmond, WA (US); Jing Jin, Sammamish, WA (US); Minyi Zhong, Redmond, WA (US); Jinglong Yang, Sammamish, WA (US)

(73) Assignee: UiPath, Inc., New York, NY (US)

( * ) Notice: Subject to any disclaimer, the term of this patent is extended or adjusted under 35 U.S.C. 154(b) by 643 days.

(21) Appl. No.: 17/558,727

(22) Filed: Dec. 22, 2021

(65) Prior Publication Data
US 2023/0195516 A1 Jun. 22, 2023

(51) Int. Cl.
| | | |
|---|---|---|
| G06F 3/00 | (2006.01) | |
| G06F 8/41 | (2018.01) | |
| G06F 9/48 | (2006.01) | |
| G06F 9/50 | (2006.01) | |
| G06F 9/54 | (2006.01) | |

(52) U.S. Cl.
CPC ............ *G06F 9/4881* (2013.01); *G06F 8/433* (2013.01); *G06F 9/5072* (2013.01); *G06F 9/542* (2013.01)

(58) Field of Classification Search
CPC ........................................................ G06F 9/48
See application file for complete search history.

(56) References Cited

U.S. PATENT DOCUMENTS

| | | | |
|---|---|---|---|
| 8,713,584 B2 | 4/2014 | Harm et al. | |
| 9,555,544 B2* | 1/2017 | Bataller | B25J 9/1679 |
| 10,616,079 B2 | 4/2020 | Layman et al. | |
| 10,654,166 B1* | 5/2020 | Hall | G05B 19/0426 |
| 11,108,618 B2 | 8/2021 | Busbee et al. | |
| 2005/0171809 A1 | 8/2005 | Klein et al. | |
| 2009/0018996 A1* | 1/2009 | Hunt | G06Q 30/02 |
| 2010/0153482 A1 | 6/2010 | Kim et al. | |

(Continued)

FOREIGN PATENT DOCUMENTS

| | | |
|---|---|---|
| CN | 110989977 A | 4/2020 |
| CN | 113119127 A | 7/2021 |

(Continued)

OTHER PUBLICATIONS

Siddharth GuptaAn, E-Commerce Website based Chatbot. (Year: 2015).*

(Continued)

*Primary Examiner* — Lechi Truong
(74) *Attorney, Agent, or Firm* — Volpe Koenig (57) ABSTRACT

According to one or more embodiments, a method is provided. The method is implemented by a trigger engine stored on a memory as processor executable instructions. The processor executable instructions being executed by a processor. The trigger engine operates as an intermediary for robotic process automations of a software platform. The method includes tracking operations within external systems and registering available events with respect to the operations into a database accessible by the robotic process automations. The method also includes enabling an active event of the external systems to be visible via a trigger of the trigger engine to the robotic process automations.

18 Claims, 6 Drawing Sheets

(56) References Cited

U.S. PATENT DOCUMENTS

| | | | |
|---|---|---|---|
| 2012/0200674 A1* | 8/2012 | Hofman | A01K 1/126 |
| | | | 382/110 |
| 2015/0332387 A1* | 11/2015 | Stacey | H04L 67/02 |
| | | | 705/27.2 |
| 2016/0328307 A1 | 11/2016 | Lu et al. | |
| 2019/0384632 A1* | 12/2019 | Parikh | G06F 21/554 |
| 2021/0103645 A1* | 4/2021 | Iordache et al. | G06V 10/82 |
| 2021/0357236 A1* | 11/2021 | Cohen | G06F 8/34 |
| 2022/0032457 A1* | 2/2022 | Anand | G06V 40/20 |
| 2022/0075605 A1* | 3/2022 | Iyer | G06N 20/00 |
| 2023/0092168 A1* | 3/2023 | Ikenaga | B25J 9/1656 |
| | | | 99/324 |
| 2024/0139968 A1* | 5/2024 | Wise | B25J 13/006 |

FOREIGN PATENT DOCUMENTS

| | | |
|---|---|---|
| EP | 3800595 A1 | 4/2021 |
| EP | 3846099 A1 | 7/2021 |
| EP | 3910468 A1 | 11/2021 |
| KR | 20200086133 A | 7/2020 |

OTHER PUBLICATIONS

Massimo Anellia, Individual vulnerability to industrial robot adoption increases support for the radical right. (Year: 2021).*

Anthony Cowley, Distributed Sensor Databases for Multi-Robot Teams. (Year: 2004).*

Extended European Search Report received in EP Application No. 22212731.8, dated Oct. 18, 2023, 9 pages.

* cited by examiner

CLOUD TRIGGERS FOR SCHEDULING ROBOTS

FIELD OF INVENTIONS

The disclosure herein relates to cloud software integration. More particularly, systems and methods herein provide a cloud triggers for scheduling robots across diverse software platforms.

BACKGROUND

Generally, a software platform includes one or more application programmable interfaces (i.e., a software intermediary) that enable the software platform to communicate with an external system (i.e., another software platform). That is, an application programmable interface (API) enables integration between diverse software platforms. Regarding cloud API integration, developers attempt to publish, integrate, aggregate, and manage APIs through a cloud platform connected to the diverse software platforms. The cloud platform may include cloud APIs that utilize trigger services. A trigger services can be a software product or code that monitors functionality (e.g., events, actions, or the like) of the external system and start or stop specific operations via cloud AIPs within the software platform.

Yet, in conventional practice, trigger services sit outside of a software eco-system (e.g., the diverse software platforms) since cloud APIs themselves are not integrated. As a result, the trigger services have no right to call back into other systems (e.g., the external system where an event is monitored) and issue within the software platform an event/action or to validate to developers, who have configured an automation process and have rights to run the automation process. Additionally, conventional trigger services remain one-to-one in that one monitored event, action, or the like start or stop one specific operation.

What is needed is a cloud triggering mechanism for scheduling robots.

SUMMARY

According to one or more embodiments, a method is provided. The method is implemented by a trigger engine stored on a memory as processor executable instructions. The processor executable instructions being executed by at least one processor. The trigger engine operating as an intermediary for one or more robotic process automations of a software platform. The method includes tracking one or more operations within one or more external systems; registering one or more available events with respect to the one or more operations into a database accessible by the one or more robotic process automations; and enabling an active event of the one or more external systems to be visible via a trigger of the trigger engine to the one or more robotic process automations.

The embodiment above can be implemented as a method, an apparatus, a device, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

The disclosure herein relates to cloud software integration. More particularly, systems and methods herein provide cloud triggers for scheduling robots across diverse software platforms. As an example, the systems and methods herein are described with respect to a trigger engine. The trigger engine can be implemented as processor executable code or software that is necessarily rooted in process operations by, and in processing hardware of, the diverse software platforms.

According to one or more embodiments, the trigger engine can provide triggering services, e.g., middle tier triggering services, that allow a trigger to be configured for executing robotic process automations (RPAs) when a registered event is encountered. One or more technical effects, advantages, and benefits of the trigger engine includes software and/or hardware (e.g., processor executable code that is necessarily rooted in the hardware) for robust and efficient connection handling between RPAs and registered events for the diverse software platforms. Further, in contrast with conventional trigger services, one or more technical effects, advantages, and benefits of the trigger engine include automatic intelligent implementations of starting RPAs, utilizing queues, and sending notifications to provide time reductions, computing efficiencies, and cost reductions.

Figure 1:
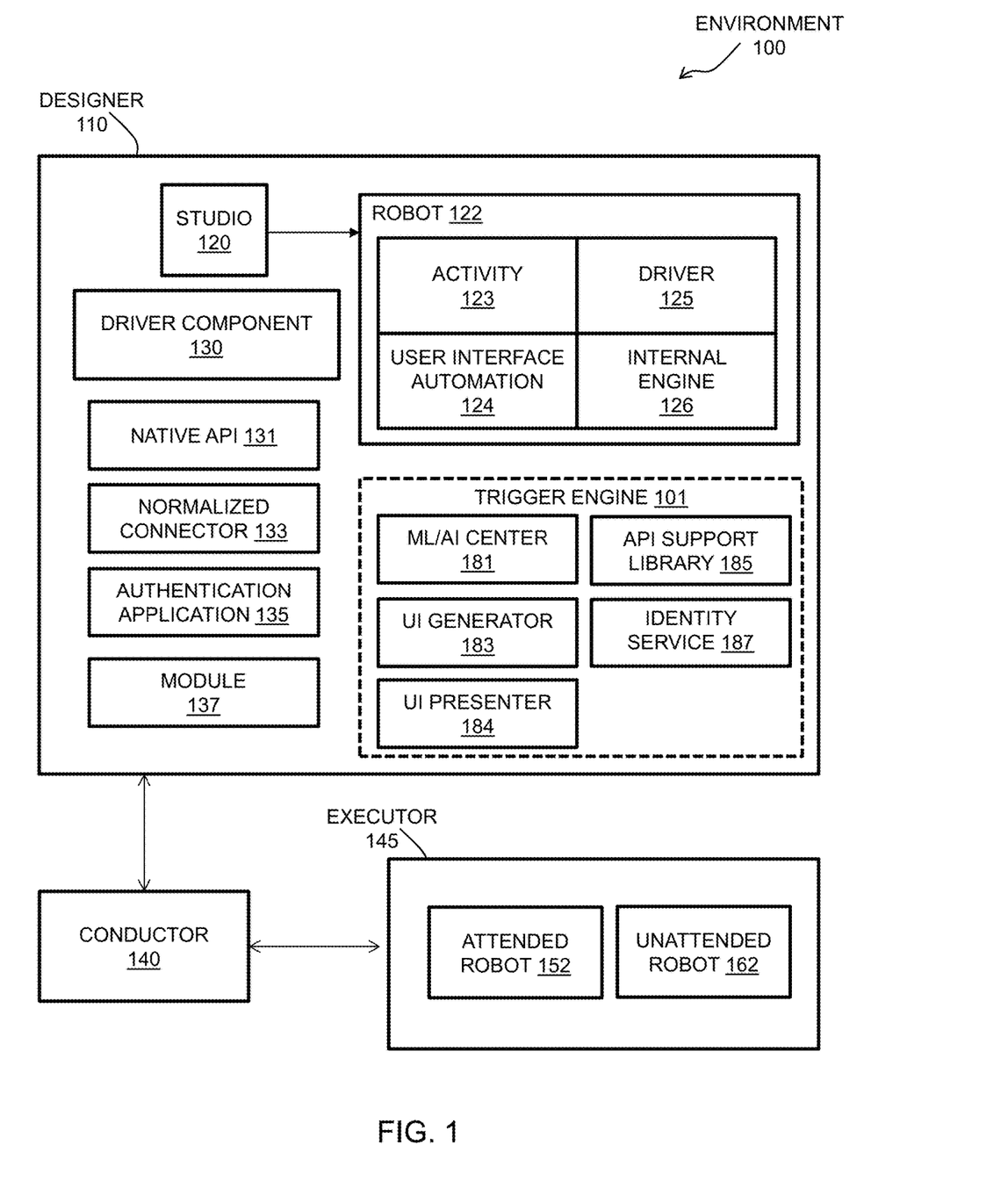
FIG. 1 depicts an environment according to one or more embodiments.

FIG. 1 depicts an environment 100 according to one or more embodiments. Generally, the environment 100 can be a design and deployment computing platform, such that a development, design, operation, and/or execution of a trigger engine 101 is illustrated in the context of RPAs, as well as machine learning and/or artificial intelligence (ML/AI) operations.

The environment 100 depicts a designer 110 including a studio 120 and a robot 120 (i.e., an example RPA). The robot 122 can include one or more of an activity 123, a user interface (UI) automation 124, a driver 125, and an internal engine 126. In connection with the studio 120, the designer 110 further includes a driver component 130, a native API 131, a normalized connector 133, an authentication application 135, and a module 137. The environment 100 also depicts a conductor 140 and an executor 145, which can execute instances/implementations of the robot 122 (e.g., shown as attended or unattended robots 152 and 162) and the trigger engine 101.

The trigger engine 101 can be hardware, software, or a combination thereof. According to one or more embodiments, the trigger engine 101 can be stored on a memory as software components, modules, instructions, or the like for execution by a processor. The trigger engine 101 is detailed as a dashed-box to illustrate a scalability and a portability of the trigger engine 101 within the environment 100. Operations/Functionality of the trigger engine 101 are further described herein.

The designer 110, the conductor 140, and the executor 145 are representative of computing devices, computing apparatuses, and/or computing systems, which comprise hardware, software, or a combination thereof. The designer 110, the conductor 140, and the executor 145, and any software thereon (e.g., the trigger engine 101) are configured to interact with a user (e.g., an operator, a developer, and/or an orchestrator) to receive inputs and provide outputs. Note that while a single block is shown for each of the components of the environment 100, that single block is representative of one or more of that component.

The designer 110 can be referred to as a studio platform, a development platform, and/or an online platform. The designer 110 can include one or more engines (i.e., in addition to the trigger engine 101), development environments (e.g., the studio 120), sub-programs (e.g., the authentication applications 135 or the modules 137), or the like. The designer 110 can be configured to generate code, instructions, commands, or the like for the robot 122 to perform or automate the activities 123 and/or provide the UI automations 124. The designer 110 can be configured to generate code, instructions, commands, or the like for the trigger engine 101 to provide automatic intelligent implementations of starting RPAs, utilizing queues, and sending notifications to provide time reductions, computing efficiencies, and cost reductions The designer 110 can also enable users to code, program, and/or design the robot 122 through the studio 120, as well as configure triggers in conjunction with the trigger engine 101. In an embodiment, the studio 120 can provide application integration, along with automating of third-party applications, administrative information technology (IT) tasks, and/or business IT processes. For example, the studio 120 and/or the trigger engine 101 can integrate features and capabilities based on calls to APIs in external systems.

As noted herein, the robot 122 is an example of an RPA. Note that, while RPAs can in some instances include applications, applets, scripts, or the like, RPAs (i.e., the robot 122) go beyond the simple operations of applications, applets, scripts, and scripts by performing and/or automating the activities 123 and/or by performing and/or providing the UI automations 124.

The activity 123 can be representative of one or more workflows, such as task sequences, flowcharts, Finite State Machines (FSMs), global exception handlers, UI transparents, or the like. Task sequences can be linear processes for handling linear tasks between one or more applications or UIs (e.g., windows). Flowcharts can be configured to handle complex business logic, enabling integration of decisions and connection of other activities 123 in a more diverse manner through multiple branching logic operators. FSMs can be configured for large workflows and use a finite number of states in their execution, which may be initiated by a condition, trigger, transition, other activity 123, or the like. Global exception handlers can be configured to determine workflow behavior when encountering an execution error, for debugging processes, or the like. UI transparents can be software operations to an underlying operating system (OS) or hardware. Non-limiting examples of operations that can be accomplished by one or more workflows may be one or more of performing log-ins, document signatures, document processing, filling a form, information technology (IT) management, user authorization, or the like.

The UI automations 124 can enable access, identification, and manipulation of UIs and UI elements of applications, software platforms, resident software, cloud software, etc. For instance, as part of RPAs or the robot 122, shapes (e.g., squares, rectangles, circles, polygons, freeform, or the like) in multiple dimensions may be utilized for UI robot development and runtime in relation to a computer vision (CV) operations of the UI automations 124. Thus, the UI automations 124 can be representative of any UI generation software and resulting UIs. For example, to run an activity 123 for a UI automation 124 (e.g., document processing), the robot 122 can uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

Thus, according to one or more embodiments, the robot 122 can perform the one or more activities 123 and/or provide the one or more UI automations 124 using the drivers 125 and/or the internal engines 126 to provide technical advantages and benefits over applications, applets, and scripts. The drivers 125 include one or more programming interfaces that control and manage specific lower level interfaces linked to (physical or virtual) hardware, low-level services, program, etc. The internal engine 126 can be a core software component of the robot 122 that causes the robot 122 to operate automatically. As noted herein, the environment 100 illustrates the attended robots 152 and the unattended robots 162 as examples of deployed/implemented robots 122.

Further, according to one or more embodiments, the robots 122 may be configured as execution agents that run the activities 123 built in the designer 110. A commercial example of the robot 112 for the UI automation 124 or software automation is UiPath Robots™. In some embodiments, the robots 122 (and/or the trigger engine 101) may install the Microsoft Windows® Service Control Manager (SCM)-managed service. As a result, the trigger engine 101 can cause the robots 122 to open interactive Windows® sessions under the local system account, and have the rights of a Windows® service. According to one or more embodiments, the robots 122 may have the same rights as a user under which a given robot is installed. This feature may also be available for High Density (HD) robots, which ensure full utilization of each machine at maximum performance, such as in an HD environment.

Furthermore, according to one or more embodiments, the robots 122 may be split, distributed, or the like into components, each being dedicated to a particular activity 123 or automation task. For instance, components of the robot 122 may include SCM-managed robot services, user mode robot services, executors, agents, command line, or the like. SCM-managed robot services, such as implemented by the trigger engine 101, may manage or monitor Windows® sessions and act as a proxy between the conductor 140 and the executor 145 (i.e., where the attended or unattended robots 152 and 162 are executed). User mode robot services, such as implemented by the trigger engine 101, may manage and monitor Windows® sessions and act as a proxy between conductor 140 and the executor 145. User mode robot services and/or SCM-managed robot services may be trusted with and manage the credentials for the robots 122. A Windows® application may automatically be launched if the SCM-managed robot service is not installed. In an example, the robot 122 may run one or more given jobs under a Windows® session (e.g., execute the activity 123 described herein) and may be aware of per-monitor dots per inch (DPI) settings. Agents may be Windows® Presentation Foundation (WPF) applications that display available jobs in a system tray window. Agents may be a client of the service. Agents may request to start or stop jobs and change settings. The command line may be a client of the service. The command line is a console application that can request to start jobs and waits for their output. According to one or more embodiments, configurations where components of the robots 122 are split can cause computing systems to more easily run, identify, and track executions by each component. Special behaviors may be configured per component this way, such as setting up different firewall rules for the robot 122 and a service. The robot 122 may be aware of DPI settings per monitor in some embodiments. As a result, the activities 123 may be executed at any DPI, regardless of the configuration of the computing system on which they were created. Projects from the designer 110 may also be independent of browser zoom level. For applications that are DPI-unaware or intentionally marked as unaware, DPI may be disabled in some embodiments.

According to one or more embodiments, the robot 122 and/or the trigger engine 101 may also engage with the driver components 130, the native APIs 131, the normalized connectors 133, the authentication applications 135, and the modules 137 within the designer 110. The driver components 130 may be utilized for the UI automation 124 by the robot 122 to get elements of a UI. Similarly, the driver components 130 may be utilized for an activity 123, by the robot 122 to get, determine, and/or predict aspects of a document. By way of example, the driver components 130 may include, but are not limited to, OS drivers, browser drivers, virtual machine drivers, enterprise drivers, and the like.

The native APIs 131 can be representative of a lightweight API interface provided or used by an application or subroutine. The native API 131, for instance, can be provided by an application provider (e.g., as any API technology) and represent a functional element for platform integration, such as for the trigger engine 101. Examples of API types include, but are not limited to type JSON Web Token (JWT), OpenID, Security Assertion Markup Language (SAML), Basic Auth, API Key, OAuth(1), OAuth2, OAuth 2.0, OAuth2Password, and MLS.

The normalized connectors 133 can be representative of connector objects and/or a list of the connector objects. According to one or more embodiments, the trigger engine 101 using the normalized connectors 133 can work with a normalized connector layer, such as Cloud Elements. Each connector object is a list of configuration parameters and/or logical code. In some cases, a normalized connector 133 can be a normalized version of the native API. For example, a connector object can include the normalized version of the native API made available as RESTful API with JSON payload in a central integration layer of the trigger engine 101. Further, a connector object can include logical code for a proprietary connector on top of salesforce API.

The authentication applications 135 can be representative of a software, a code, and/or an application configured in an external system (i.e., external to the trigger engine 101) that provides a mechanism for the trigger engine 101 to authenticate the robot 120 and/or the user in a trusted manner. According to one or more embodiments, the trigger engine 101 can store and depend on configured authentication applications 135 from external systems. The mechanism can be any API type or any native API 131, such as OAuth 2.0. According to one or more embodiments, once the authentication application 135 registered with the external system, the trigger engine 101 can store application credentials, so the users do not need to write a database.

The modules 137 can be representative of any combination of hardware (e.g., independent electronic circuits packaged onto a circuit board) and/or software (e.g., firmware), or other sub-software module, to provide a function within the environment 100. According to one or more embodiments, the modules 137 can be representative any independent discrete piece of code created and maintained to be used in diverse software platforms. The modules 137 can be representative of triggers created and configured by the trigger engine 101.

According to one or more embodiments, at development, the robot 122 can be produced at/by the designer 110 (e.g., the studio 120 and/or the trigger engine 101). Further, at deployment, the robot 122 may be managed, controlled, configured or the like at/by the conductor 140 and/or instances of the trigger engine 101.

The conductor 140 (and/or the trigger engine 101 therein) can command or instruct the robots 122 or the executor 145 to execute or monitor one or more operations (e.g., workflows) regardless of location. For example, the trigger engine 101 of the conductor 140 provides robust and efficient connection handling between the robots 122 and registered events that match operations in a mainframe, web, virtual machine, remote machine, virtual desktop, enterprise platform, online platform, cloud environment, desktop app (s), browser, or the like. The conductor 140 (and/or the trigger engine 101 therein) may act as a central or semi-central point to instruct or command the robots 122 to automate a computing platform (e.g., the environment 100). The conductor 140 (and/or the trigger engine 101 therein) may provide interconnectivity by acting as the centralized point of communication for third-party solutions and/or applications.

According to one or more embodiments, the conductor 140 may be configured for provisioning, deployment, configuration, queueing, monitoring, logging, and/or providing interconnectivity. Provisioning may include creating and maintenance of connections or communication between the trigger engine 101, the robots 122, the executor 145, and conductor 140. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets).

The executor 145 and (and/or the trigger engine 101 therein) can command or instruct the robots 122 to execute or monitor one or more operations (e.g., workflows) in a mobile computing system (within the environment 100). As noted herein, the conductor 140 and the executor 145 can download/acquire/transmit the trigger engine 101 and/or the robot 122. That is, the robot 122 can be provided as the attended robot 152 or the unattended robot 162, and the trigger engine 101 can be provided to the executor 145 as a separate software instance. For attended operations, automation by the attended robot 152 may be performed by receiving input, commands, instructions, guidance, or the like from a third party component. For unattended operations, automation by the unattended robot 162 may be performed without third party inputs or control. The attended robot 152 and/or the unattended robot 162 may run on or execute in the mobile computing system of the executor 145.

Figure 2:
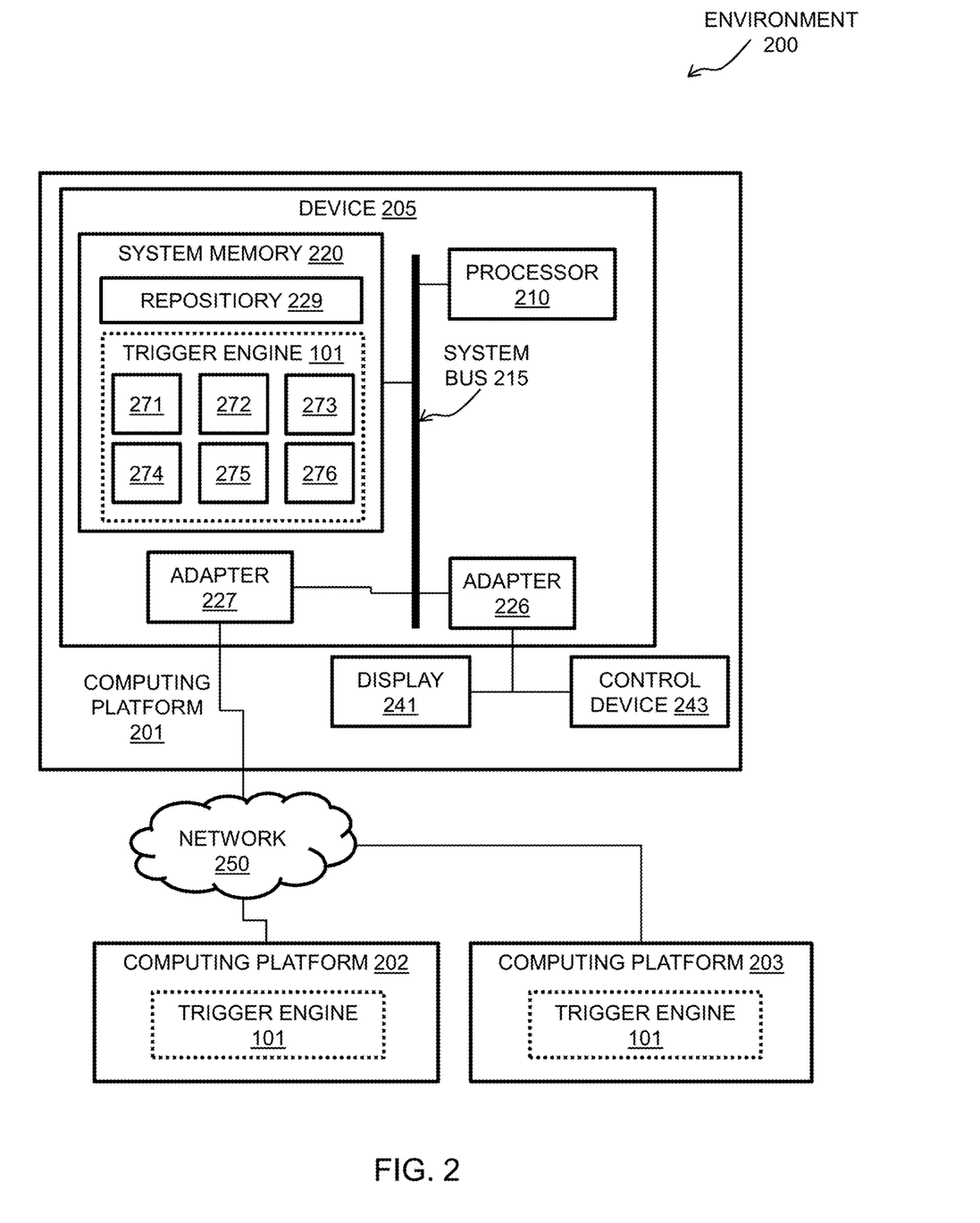
FIG. 2 depicts an environment according to one or more embodiments.

Operations and/or configurations of the trigger engine 101 are now described with respect to FIGS. 1-2. In this regard, the trigger engine 101 (regardless of which location or which instance) can include and leverage the ML/AI center 181, the UI generator 183, the UI presenter 184, and the API support library 185, and the identity service 187.

The ML/AI center 181 can include a ML sub-program that derives meaning from one or more operations (e.g., workflows) for triggers via conceptual, data, logical, and/or physical modeling. Further, ML/AI center 181 can include an AI sub-program that extracts and/or predicts the one or more operations. For example, the ML/AI center 181 can build, manage, and/or stores algorithms and/or models, such as statistical mathematical models that embodies a set of statistical assumptions, concerning the identification of the one or more operations with respect to registered events, e.g., made available within the API support library 185.

The UI generator 183 can include a UI and graphic UI (GUI) sub-programs for users and/or RPAs to create/generate/manage UIs, GUIs, and the like. As discussed herein, UIs and GUIs can include, but are not limited to, internet browsers, graphic user interfaces, window interfaces, and/or other visual interfaces for applications, operating systems, file folders, and the like. The UI presenter 184 can include one or more sub-modules for providing or displaying the UIs, GUIs, and the like generated by the UI generator 183. According to one or more embodiments, the UI generator 183 can integrate with the ML/AI center 181 and the UI presenter 184 to encounter one or more operations that trigger the robots 120.

The API support library 185 can include, store, and manage classes, objects, and methods, which closely resemble APIs. According to one or more embodiments, the API support library 185 can include a set of code libraries that provide backward-compatible versions of any API type or any native API 131.

The identity service 187 can include mechanisms and/or protocols that provide a standardized format allowing the robot 120 and/or the users to input their identity and access management system controls for enhance connection access sharing. The identity service 187 can utilize tokens to enable authenticating or identity authentication with applications. The identity service 187 also supports right to call back to the robot 122.

Note that the trigger engine 101, on a fundamental level, can operate as an intermediary for the attended robot 152 and/or the unattended robot 162 to events elsewhere in the environment 100. Thus, turning to FIG. 2, an environment 200 is shown according to one or more embodiments. The environment 200 illustrates diverse computing platforms 201, 202, and 202 executing one or more instances of the trigger engine 101 in the context of RPAs. In connection with FIG. 1, the one or more instances of the trigger engine 101 of FIG. 2 are representative of trigger engine 101 of FIG. 1 and components therein. Further, embodiments of the diverse computing platforms 201, 202, and 202 may include apparatuses, systems, methods, and/or computer program products at any possible technical detail level of integration. In this regard, each computing platform 201, 202, and 202 can be representative of any computing device, computing apparatus, and/or computing environment, which comprise hardware, software, or a combination thereof. For example, the computing platform 201 can be representative of hardware supporting the trigger engine 101, as well as the designer 110, the conductor 140, and/or the executor 145. In this regard, the computing platform 201 can include a device 205, which may align with any of the designer 110, the conductor 140, and the executor 145 of FIG. 1. According to one or more embodiments, the device 205 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

The device 205 includes one or more processors 210, which is describes as "the processor 210" for ease of explanation. The processor 210 is coupled via a system bus 215 to a system memory 220 and various other components.

The processor 210 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. The processor 210 may also have multiple processing cores, and at least some of the cores may be configured to perform specific functions. Multi-parallel processing may also be configured. In addition, at least the processor 210 may be a neuromorphic circuit that includes processing elements that mimic biological neurons. The processor 210 can also be representative of cloud processing across the environment 200.

The system bus 215 (or other communication mechanism) is configured for communicating information or data to the processor 210, the system memory 220, and various other components, such as adapters 226 and 227.

The system memory 220 is an example of a (non-transitory) computer readable storage medium. For instance, the system memory 220 can include any combination of a read only memory (ROM), a random access memory (RAM), internal or external Flash memory, embedded static-RAM (SRAM), solid-state memory, cache, static storage such as a magnetic or optical disk, or any other types of volatile or non-volatile memory. Non-transitory computer readable storage mediums may be any media that can be accessed by the processor 210 and may include volatile media, non-volatile media, or the like. For example, the ROM is coupled to the system bus 215 and may include a basic input/output system (BIOS), which controls certain basic functions of the device 205, and the RAM is read-write memory coupled to the system bus 215 for use by the processor 210. Non-transitory computer readable storage mediums can include any media that is removable, non-removable, or the like. The system memory 220 can also be representative of cloud memory storage across the environment 200. The system memory 220 can include/store a repository 229 and/or software (e.g., the trigger engine 101).

The repository 229 can database (e.g., an SQL database) and/or another storage mechanism. According to one or more embodiments, the repository 229 can include RPAs (the robot 122), registered events (of the API support library 185), and other data, such as documents, entities, confidence metrics, images, segments, hashes, video, frames, source data, robot video, source code, etc., for access by the trigger engine 101. According to one or more embodiments, the repository 229 can store the driver components 130, the native APIs 131, the normalized connectors 133, the authentication applications 135, and the modules 137. According to one or more embodiments, a model can be built and stored in the repository 229 during a training phase of the trigger engine 101.

The device 205 can include the adapters 226 and 227, which can be representative of one or more of input/output (I/O) adapters, device adapters, and communications adapters. According to one or more embodiments, the I/O adapter can be configured as a small computer system interface (SCSI), of in view of frequency division multiple access (FDMA) single carrier FDMA (SC-FDMA), time division multiple access (TDMA), code division multiple access (CDMA), orthogonal frequency-division multiplexing (OFDM), orthogonal frequency-division multiple access (OFDMA), global system for mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication.

The device adapter (e.g., the adapter 226) interconnects input/output devices to the system bus 215, such as a display 241 and a control device 243 (e.g., a keyboard, a camera, a speaker, etc.). The communications adapter (e.g., the adapter 227) interconnects the system bus 215 with a network 250 enabling the computing platform 201 to communicate with other computing platforms 202 and 203. In one embodiment, the adapters 226 and 227 may be connected to one or more I/O buses that are connected to the system bus 215 via an intermediate bus bridge. Suitable I/O buses for connecting peripheral devices such as hard disk controllers, network adapters, and graphics adapters typically include common protocols, such as the Peripheral Component Interconnect (PCI).

The display 241 is configured to provide one or more UIs or GUIs that can be captured by and analyzed by the trigger engine 101, as the users interacts with the device 205. Examples of the display 241 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD) display, a Retina© display, an in-plane switching (IPS) display or the like. The display 241 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

The control device 243, such as a computer mouse, a keyboard, a touchpad, a touch screen, a keypad, or the like, may be further coupled to the system bus 215 for input to the device 205. In addition, one or more inputs may be provided to the computing platform 201 remotely via the other computing platforms 202 and 203 in communication therewith, or the device 205 may operate autonomously.

The network 250 can be a wired network, a wireless network, or include one or more wired and wireless networks, as well as an outside or a cloud network. According to one or more embodiments, the network 250 is an example of a short-range network (e.g., local area network (LAN), or personal area network (PAN)). Information can be sent, via the network 250, between the computing platforms 201, 202, and 203 using any one of various short-range wireless communication protocols, such as Bluetooth, Wi-Fi, Zigbee, Z-Wave, near field communications (NFC), ultra-band, Zigbee, or infrared (IR). According to one or more embodiments, the network 250 is an example of one or more of an Intranet, a local area network (LAN), a wide area network (WAN), a metropolitan area network (MAN), a direct connection or series of connections, a cellular telephone network, or any other network or medium capable of facilitating communication. Information can be sent, via the network 250, using any one of various long-range wireless communication protocols (e.g., TCP/IP, HTTP, 3G, 4G/LTE, or 5G/New Radio). Note that wired connections can be implemented using Ethernet, Universal Serial Bus (USB), RJ-11 or any other wired connection and wireless connections can be implemented using Wi-Fi, WiMAX, and Bluetooth, infrared, cellular networks, satellite or any other wireless connection methodology.

According to one or more embodiments, the operations/functionality of the computing platform 201 with respect to the trigger engine 101 can also be implemented on the computing platforms 202 and 203, as represented by separate instances of the trigger engine 101. The operations/functionality of the trigger engine 101 can be configured in hardware, software, or combination thereof, stored as software components, modules, engines, instructions, or the like in the system memory 220 for execution by the processor 210.

For instance, the trigger engine 101 being stored on the system memory 220 and executed by the processor 210 can (in contrast with conventional trigger services) design/configure/provide the robot 122. In accordance with one or more embodiments, the trigger engine 101 can provide or be part of a framework/mechanism (e.g., the environments 100 and 200) that automatically implements codes and designs the robot 122 within the studio 120 of the designer 110. In this regard, the trigger engine 101 can include one or more layers, such as a connector layer and central integration layer. The connector layer can implement and manage the normalized connectors 133. The central integration layer can mediate, transform, route, and convert authentication requests between a software intermediary and another software platform.

Further, the trigger engine 101 being stored on the system memory 220 and executed by the processor 210 can (in contrast with conventional trigger services) operate as a middle tier trigger service integrated with an element service to register an operation, action, or the like (collectively referred to as an registered event for ease of explanation) while configuring a trigger, perform the activities 123, provide the UI automations 124, start RPAs, utilize queues, and send notifications to provide time reductions, computing efficiencies, and cost reductions. Further, according to one or more embodiments, the trigger engine 101 may be configured to store information, instructions, commands, or data to be executed or processed by the processor 210 to enable operations 271, 272, 273, 274, 275, and 276.

Regarding operation 271, the trigger engine 101 can trigger an RPA. In this regard, one or more technical effects, advantages, and benefits of the trigger engine 101 includes software and/or hardware (e.g., processor executable code that is necessarily rooted in the hardware) for robust and efficient connection handling between the RPAs and the registered events for the diverse software platforms. For example, operations of the computing platform 202 can be registered as events in the trigger service 101 of computing platform 201, such that one or more RPAs of the computing platform 203 can be triggered in response to those operations executing. More particularly, the trigger engine 101 can provide triggering services, such as middle tier triggering services, that allow a trigger to be created and configured for executing (unattended) RPAs when a registered event is encountered (e.g., the middle tier triggering services provide multiplexing of any number of RPAs (e.g., 'N' number, where N is an integer greater than 0) by at least a single registered event).

A trigger, generally, is a discreate set of code within the trigger engine 101 that connects RPAs to registered events. Triggers can be stored and managed in the trigger engine 101. The configuration by the trigger engine 101 includes selecting a process folder, a job type, and relevant arguments (that are passed at runtime to the RPAs). The process folder can include a storage location for the trigger and/or the RPAs. The job type can define where or how the RPAs should run. The arguments can include, but are not limited to, one or more actual inputs to passed/supplied to the RPAs.

According to one or more embodiments, the trigger engine 101 can configure the trigger to schedule one or more RPAs when the registered event is encountered. By way of example, after the registered event is encountered, the trigger engine 101 schedules one or more RPAs (e.g., the robot 122) in the studio 120 in such a way (as configured) to execute the one or more RPAs.

Regarding operation 272, the triggers of the trigger service 101 can be cloud triggers (i.e., a cloud triggering mechanism) for scheduling the robots 122 based on operations on diverse software platforms external to locations of the robots 122 (e.g., cloud triggered robots can be triggered for external events). For instance, the middle tier triggering services of the trigger engine 101 can implement cloud triggers, such that the trigger engine 101 can interpret and understand external systems connected to a cloud environment and security models thereof. In this regard, when the registered event is encountered for a cloud trigger, the trigger engine 101 can validate rights to the one or more of the triggered RPAs (e.g., determine whether a user who configured the RPAs have rights), as well as retain the right to call back to the triggered RPAs.

According to one or more embodiments, the cloud triggers can be associated with and/or connected to long running workflows. 'Long' running implies a workflows that extends over a period of time (e.g., five minutes, an hour, a work day, a calendar week, etc.) that is greater than an immediate instance. For example, an operation of the computing platform 202 (e.g., which is an external event to the computing platform 203) can trigger a long running document signing workflow to continue/restart. This operation can include creating and sending a document across the network 250 to the computing platform 202 for signing. Next, the workflow sleeps and waits for signing operation (e.g., a next external operation/event/trigger) to further cause the long running document signing workflow to restart/continue.

Regarding operation 273, the trigger engine 101 can add information or the robot 122 to a queue. A queue can be a collection of entities maintained in a sequence. For instance, the trigger engine 101 can directly pass/add information of an encountered event to a queue itself (e.g., instead of using arguments for a trigger). The trigger engine 101 can add the robot 122 to the queue of the computing system 203, such that all robots 122 in the queue execute in a particular order.

Regarding operation 274, the trigger engine 101 can provide notifications. A notification can be any instance or mechanism for providing information to the robot 122 and/or the user. Notification can include, but are not limited to, pop-up windows or prompts, drown down menus or prompts, text message notifications, email notifications, bubble indicators, numerical indicators, and flags. According to one or more embodiments, the trigger engine 101 can provide notifications to an attended user or the attended robot 162. In this regard, the notifications enable the user to choose whether to execute the attended robot 162 when a corresponding registered event is encountered. For example, the trigger engine 101 can send a notification indicating that the attended robot 162 is ready to execute (e.g., "Do you want to run this automation?"). Further, the trigger engine 101 can send a notification indicating that the registered event was encountered (e.g., triggering a window on user desktop indicating "The document you are waiting for has been signed by a validator and a respective automation is waiting for you. Do you want to run?").

Regarding operation 275, the cloud triggers of the trigger engine 101 can send push notifications for starting an application. According to one or more embodiments, the trigger engine 101 can provide notifications to a mobile phone. In this regard, registered events encounter outside of the mobile phone can cause the trigger engine 101 to send push notifications to the mobile phone. For example, for an expense report that is waiting for an approval in the computing environment 202, the trigger engine 101 of the computing platform 101 monitors for the approval. Once the approval occurs, the trigger engine 101 of the computing platform 101 sends according to a corresponding trigger a notification to mobile phones of anyone waiting for such approval. In turn, the user can act on the notification, such as by open an application on the mobile phone and continuing any business analysis of the expense report.

Regarding operation 276, the trigger engine 101 can execute inside a network as a virtual machine rather than rely on external elements (e.g., an element service to register an operation, action, or the like). For instance, if the computing platform 202 is a corporate network, the instance of the trigger ending 101 therein can be a virtual machine that directly detects the operations of the computing platform 202.

Figure 3:
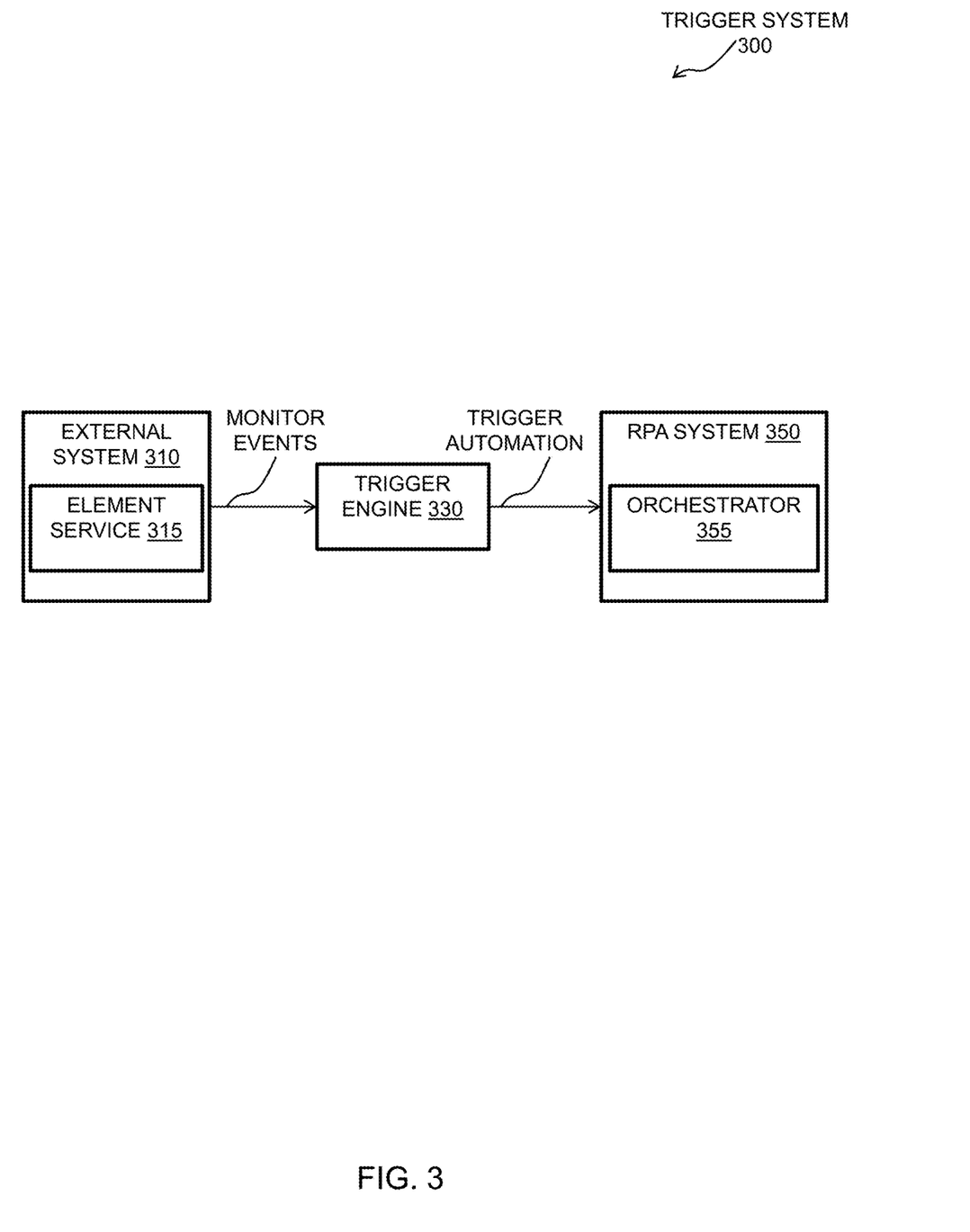
FIG. 3 illustrates a trigger system according to one or more embodiments.
Figure 4:
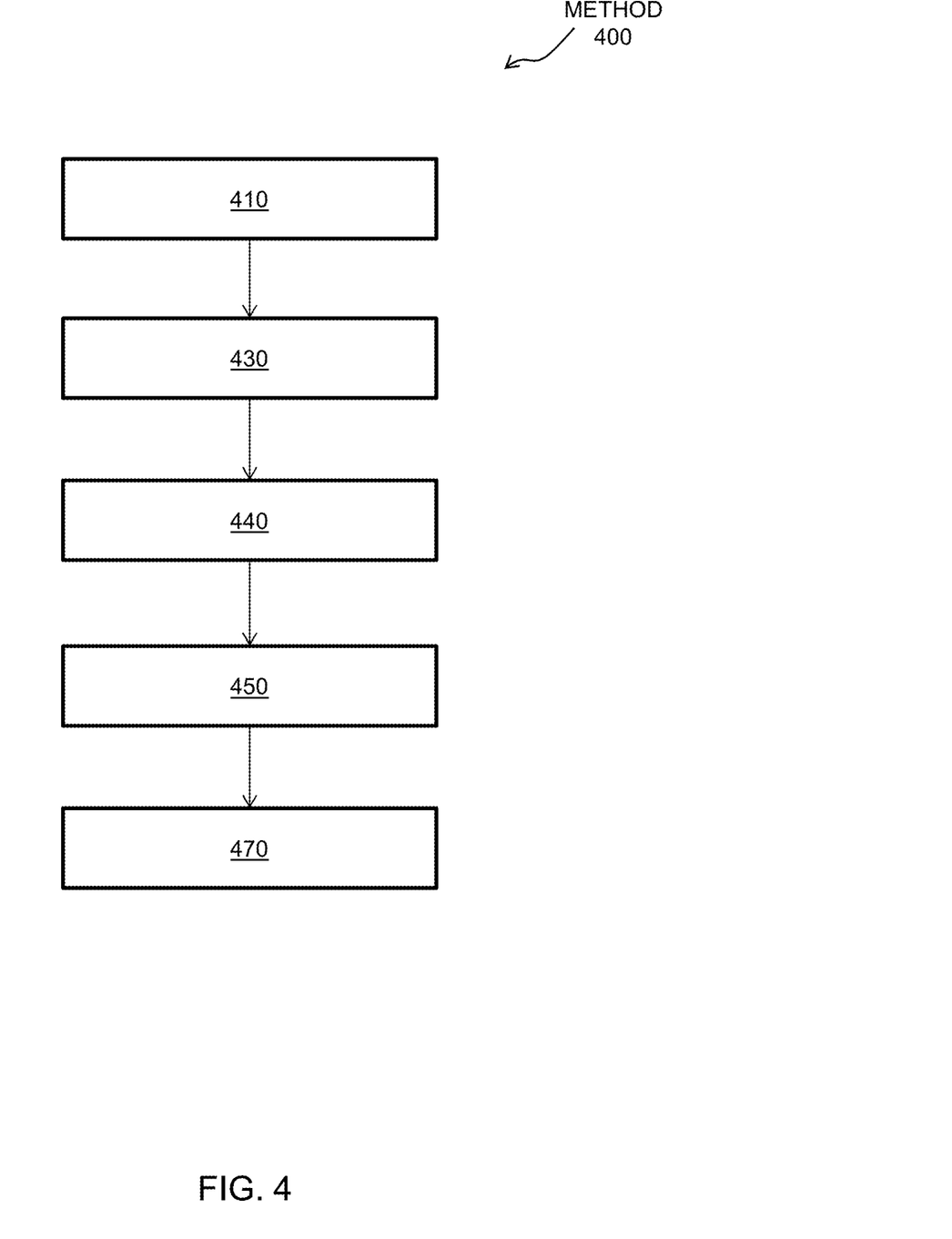
FIG. 4 illustrates a method according to one or more embodiments.

Turning now to FIGS. 3-4, a trigger system 300 and a method 400 are illustrated according to one or more embodiments. For ease of explanation and brevity, items and elements of FIGS. 3-4 are described in conjunction, while noting that elements of FIGS. 3-4 may align with elements of FIGS. 1-2.

The trigger system 300 of FIG. 3 includes an external system 310 including an element service 315, a trigger engine 330, and an RPA system 350 including an orchestrator 355. Generally, the external system 310 can be representative of one or more systems (e.g., the computing platform 202) outside but connected to the RPA system 350. The external system 310 can provide the element service 315, which is software that registers operations of the external system 310 (e.g., Cloud Elements). The element service 315 can support supports polling, web hooks, and the like. The trigger engine 330 provide a specific configuring and tooling robotic middle tier trigger service method with respect to the intelligent automation experience between the external system 310 and the RPA system 350 (i.e., an intermediary for RPAs of the RPA system 350). The RPA system 350 can be representative of one or more systems (e.g., the computing platform 203) including the orchestrator 355, which is software that executes RPAs.

The method 400 is an example implementation of the trigger system 300. The method 400 begins at block 410, where the trigger system 300 tracks operations within the external system 310. According to one or more embodiments, the trigger engine 330 can also pull information from the element service 315 regarding operations therein and/or acquire a list from the element service 315. The list is representative of a table, a sequence, or like data type and include information on each operation. The element service 315 can collect the list of available operations and/or send the list to the trigger engine 330. The element service 315 can also individually send information on each operation as that operation occurs within the external system 310 to the trigger engine 330.

At block 430, the trigger system 300 registering available events. In this regard, the trigger engine 330 makes the list available for the users and/or the robots 122. More particularly, the trigger engine 330 registers the operations of the element service 315 (e.g., an eco-system of Cloud Element) and operation information as available events into a database accessible by the RPAs of the RPA system 350. One or more technical effects, advantages, and benefits of the trigger engine making the list is available include enabling corresponding RPA processes to be configured. That is, with the list available, whenever an operation happens at the external system 310, the element service 315 can send information to the middle tier trigger service (e.g., the trigger engine 330) to make that operation visible to the user for configuring a trigger. Further, via the trigger, the RPAs of the RPA system 350 can not see events that otherwise would not be visible in conventional trigger services.

At block 440, the trigger engine 330 creates a trigger. As noted herein, the trigger can be a discreate set of code that connects the RPAs of the RPA system 350 to the registered events of the trigger engine 330.

Figure 5:
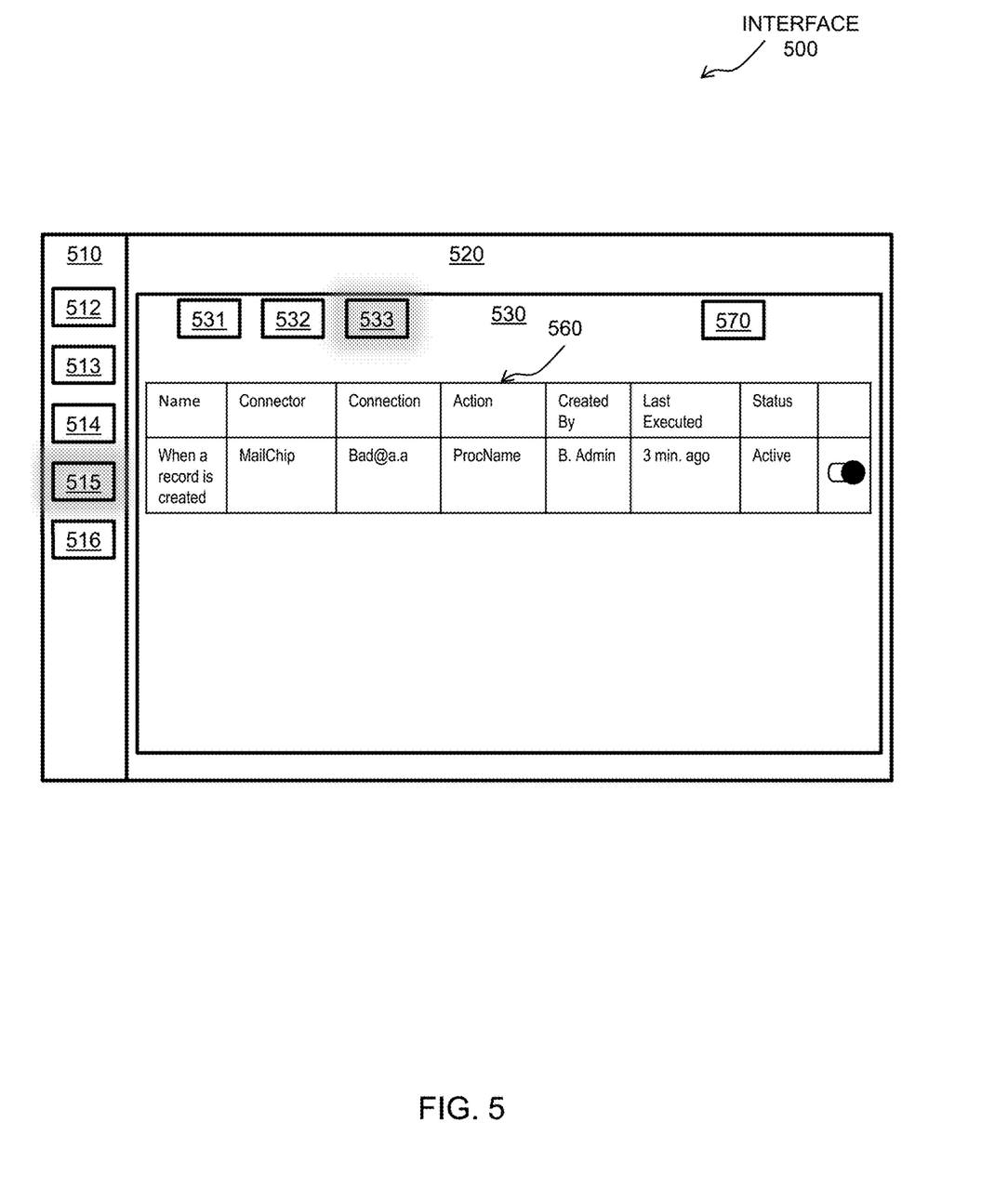
FIG. 5 illustrates an user interface according to one or more embodiments.
Figure 6:
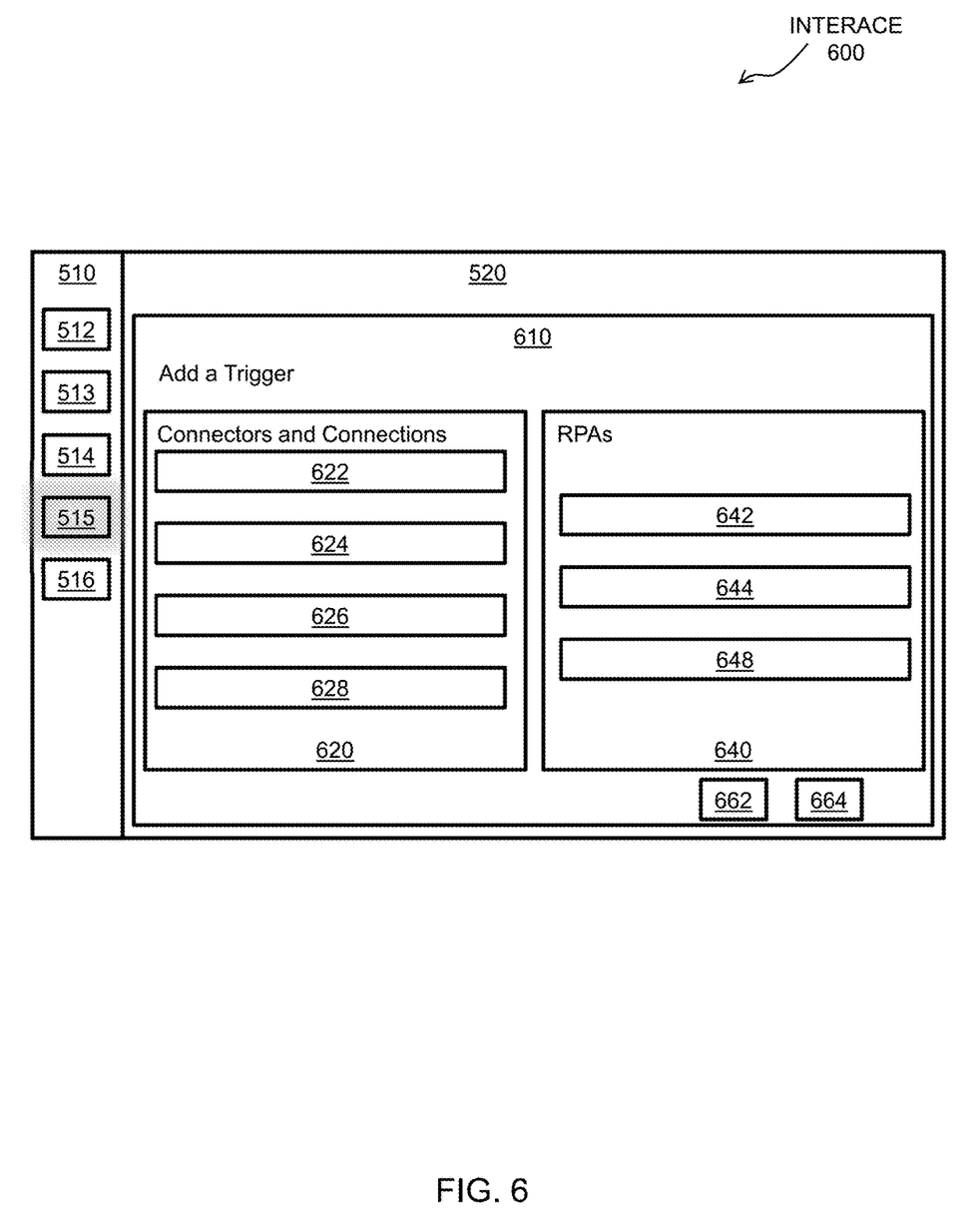
FIG. 6 illustrates an user interface according to one or more embodiments.

FIG. 5 illustrates a user interface 500, which can demonstrate visually how the trigger engine 330 manages one or more triggers, according to one or more embodiments. FIG. 6 illustrates a user interface 600, which can demonstrate visually how the trigger engine 330 creates one or more triggers, according to one or more embodiments. Each of the user interface 500 and 600 are configured to received one or more user inputs for managing, creating, and configuring the one or more triggers.

The user interface 500 includes a menu 110 providing one or more selectable icons 512, 513, 514, 515, and 516. As shown by the highlight, the selectable icon 515 is selected. The user interface 500 includes a frame 520 that presents one or more areas in accordance with which of the one or more selectable icons 512, 513, 514, 515, and 516 is selected. The menu 110 and the frame 520 can be arranged in any orientation, and are not limited to a side-by-side positioning. The frame 520 presents an integration area 520 where users or RPAs can configure a trigger. The integration area 520 provides tabs 531, 532, and 533. The tab 531 can be a connectors tab. The tab 532 can be a connection tab. The tab 533 can be a trigger tab. For example, the connecter and connection tabs enable viewing of registered events and RPAs, respectively, per configuration. The trigger tab enables viewing of all triggers. Further, the integration area 520 provides an 'Add Trigger' button 570. For instance, upon hitting the 'Add Trigger' button 570, the trigger engine 330 can present a configuration area 610 as shown in the user interface 600.

The configuration area 610 depicts one or more fields with respect to adding a trigger. A frame 620 of the configuration area 610 presents fields with respect to connectors and connections configurations. Examples of the one or more fields for connectors and connections configurations include, but are not limited to, such as a connection field 622, a connector field 624, an event field 626, and a record field 638. The connection field 622 can provide the user or the robot 122 all connections/applications for selection (and upon selection that connection is used). The connector field 624 can provide the user or the robot 122 all connectors/users for selection (to designate which user the trigger will relate to). The event field 626 can provide all registered events for selections (e.g., when a record is created). The record field 638 can provide all types of record for selection (e.g., a marketing record). This, in an example, the connection field 622 can select a mail application, the connector field 624 can identify a first user, the event field 626 can indicate 'when a record is created', and the record field 638 can indicate that the record must be a marketing record.

A frame 640 of the configuration area 610 presents fields with respect to RPA configurations. The frame 640 enables the user or the robot 122 to define a RPA to be triggered after the registered event (of frame 620) encountered. Examples of the one or more fields for RPA configurations include, but are not limited to, such as a process field 642, a job type field 644, and an argument field 646. The process field 642 can enable the user or the robot 122 to input a location of an RPA folder at the orchestrator 355. The job type field 644 can enable the user or the robot 122 to indicate unattended, attended, or server less jobs, along with some rules of what can be started and what cannot be started. Note that a job type determines where the RPA should execute. For instance, the user can option for where exactly the RPA should run irrespective whatever the selected job type. The argument field 646 can enable the user or the robot 122 to pass available arguments at run time while executing the RPA. The user interface 600 depicts a cancel button 642 that can exit the configuration area 610 and a "Add Trigger" button 664 to create a trigger according to the configuration.

At block 450, the trigger engine 330 enables an active event of the external system 310 to be visible via a trigger (configured at block 440) to the RPAs of the RPS system 350. For example, when a record created in the external system 310 or when an email arrives in the external system 310, these events are now visible through the triggers. In turn, at block 450, the trigger system monitors for the active event to occur.

At block 480, the trigger engine 330 initiates activity based on active event (e.g., executes an RPA). According to one or more embodiments, based on a configuration set in the UI of the trigger engine 330, the trigger system 300 passes instructions to the orchestrator 355 while executing an RPA. For example, after configuring a trigger to run a RPA, the trigger system 300 informs the orchestrator 355 to run a configured RPA as server less and pass arguments (i.e., selected at configuration) to the RPA at runtime. As another example, once the trigger engine 330 get the active event, the trigger engine 330 starts the RPA in the orchestrator 355, where the RPA can be an unattended job on a physical machine, a server job, or a cloud robot based job. As another example, once the trigger engine 330 get the active event, the trigger engine 330 can schedule and/or queue the RPA at the orchestrator 355.

According to one or more embodiments, the trigger engine 300 can provide shared processes for individuals. In this regard, on a side of the orchestrator 355, a process can be designed using middle tier trigger service of the trigger engine 330 to execute when an event is shared across an organization at the orchestrator 355 (e.g., where the users, in organization, are able to customize the process to trigger from the events occurred on their connections). Further, if a process is shared among a set of users in the organization and the process can be bonded to individual connections (e.g., an outlook connection) of the users and the same shared RPA get started by monitoring events from individual connection to trigger that process. By way of example, an organization can take and share a process through the UI of the trigger engine 330 to all organization members. Those members can act on the process from the UI of the trigger engine 330, wherein the actions could be enabling and/or adding which type of individual connection is used for monitoring an event and executing the shared process. Since a trigger configuration can already associated to the shared process by the trigger engine 330, the shared process can be by the organization members for automatic discovering and registering of the trigger. For example, if a process is configured to trigger by an email event, then an outlook connection can be added to that process via the UI of the trigger engine 330. So, whenever such event occurs, the RPA starts executing in one of the instances owned by the user.

According to one or more embodiments, the trigger engine 330 can implements and on-premises scenario within the external system 310 (e.g., from the Cloud Element side). In this regard, all the events are monitored within the external system 310 using a ground to cloud technology (e.g., a Gateway Technology) from Cloud Elements. The gateway technology further enables communication between any cloud RPA and local devices. A trigger can be configured with respect to these events to execute RPAs within the external system 310 (e.g., on-premises of local devices as well). For example, an on-premises system can be monitored such that if a new record is added in the on-premises system, a trigger can be issued to start a cloud RPA.

According to one or more embodiments, a method implemented by a trigger engine is provided. The trigger engine is implemented using processor executable instructions stored on a memory and being executed by at least one processor. The trigger engine operates as an intermediary for one or more robotic process automations of a software platform. The method includes tracking one or more operations within one or more external systems; registering one or more available events with respect to the one or more operations into a database accessible by the one or more robotic process automations; and enabling an active event of the one or more external systems to be visible via a trigger of the trigger engine to the one or more robotic process automations.

According to one or more embodiments or any of the method embodiments herein, the trigger engine can pull information from an element service of the one or more external systems regarding the one or more operations to acquire a list to track the one or more operations.

According to one or more embodiments or any of the method embodiments herein, the registering of the one or more available events can include making a list available for the one or more robotic process automations.

According to one or more embodiments or any of the method embodiments herein, the trigger can include a discreate set of code that connects the one or more robotic process automations of the software system to the registered events corresponding to the one or more operations within the one or more external systems.

According to one or more embodiments or any of the method embodiments herein, the method can include creating the trigger based on one or more user inputs according to connectors, connections, and robotic process automations configurations.

According to one or more embodiments or any of the method embodiments herein, the method can include executing at least one of the one or more robotic process automations based on the trigger.

According to one or more embodiments or any of the method embodiments herein, the method can include adding at least one of the one or more robotic process automations to a queue based on the trigger.

According to one or more embodiments or any of the method embodiments herein, the method can include providing a notification prior to executing at least one of the one or more robotic process automations to a queue based on the trigger.

According to one or more embodiments or any of the method embodiments herein, the trigger can include a cloud trigger, and the one or more external systems can include a cloud environment.

According to one or more embodiments or any of the method embodiments herein, the method can include scheduling at least one of the one or more robotic process automations to execute based on the trigger.

According to one or more embodiments or any of the method embodiments herein, the method can be implemented as at least one processor, an apparatus, a device, a system, and/or a computer program product.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. For instance, for any of the methods and processes described herein, the steps recited may be performed out of sequence in any order and sub-steps not explicitly described or shown may be performed. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic. In addition, "coupled" or "operatively coupled" may mean that objects are linked but may have zero or more intermediate objects between the linked objects. Also, any combination of the disclosed features/elements may be used in one or more embodiments.

In addition, the methods and processes described herein may be implemented in a computer program, software, and/or firmware (e.g., a computer program product) incorporated in a computer-readable medium for execution by a computer or processor. That is, the computer program product may include a computer readable storage medium (or media) having computer readable program instructions thereon for causing a controller, processor, or the like to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick.

The computer readable program instructions described herein can be communicated and/or downloaded to respective controllers, processors, or the like from an apparatus, device, computer, or external storage via a connection, for example, network communications. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method implemented by a trigger engine implemented using processor executable instructions stored on a memory and being executed by at least one processor, the trigger engine operating as an intermediary for one or more robotic process automations of a software platform, the method comprising:
    tracking, by the trigger engine comprising middle tier triggering services that multiplex the one or more robotic process automations of the software platform by a registered event, one or more operations within one or more external systems;
    registering, by the trigger engine, one or more available events with respect to the one or more operations into a database accessible by the one or more robotic process automations;
    generating, by the trigger engine, a trigger configured for executing an unattended robotic process automation of the one or more robotic process automations when the registered event of the one or more available events is encountered; and
    enabling, by the trigger engine, an active event of the one or more external systems to be visible via the trigger of the trigger engine to the one or more robotic process automations, the trigger comprising a discreate set of code that connects the one or more robotic process automations of the software platform to the one or more available events registered to the one or more operations within the one or more external systems and is configured for executing the one or more robotic process automations when the registered event of the one or more available events is encountered.

2. The method of claim 1, wherein the trigger engine pulls information from an element service of the one or more external systems regarding the one or more operations to acquire a list to track the one or more operations.

3. The method of claim 1, wherein the registering of the one or more available events comprises making a list available for the one or more robotic process automations.

4. The method of claim 1, further comprising:
    creating the trigger based on one or more user inputs according to connectors, connections, and robotic process automations configurations.

5. The method of claim 1, further comprising:
    executing at least one of the one or more robotic process automations based on the trigger.

6. The method of claim 1, further comprising:
    adding at least one of the one or more robotic process automations to a queue based on the trigger.

7. The method of claim 1, further comprising:
    providing a notification prior to executing at least one of the one or more robotic process automations to a queue based on the trigger.

8. The method of claim 1, wherein the trigger comprises a cloud trigger, and
wherein the one or more external systems comprises a cloud environment.

9. The method of claim 1, further comprising:
scheduling at least one of the one or more robotic process automations to execute based on the trigger.

10. At least one processor configured to implement a trigger engine stored as processor executable instructions, the trigger engine operating as an intermediary for one or more robotic process automations of a software platform the trigger engine comprising middle tier triggering services that multiplex the one or more robotic process automations of the software platform by a registered event, and the processor executable instructions being executable by the at least one processor to cause the trigger engine to:
track one or more operations within one or more external systems;
register one or more available events with respect to the one or more operations into a database accessible by the one or more robotic process automations;
generate, by the trigger engine, a trigger configured for executing an unattended robotic process automation of the one or more robotic process automations when the registered event of the one or more available events is encountered; and
enable an active event of the one or more external systems to be visible via the trigger of the trigger engine to the one or more robotic process automations, the trigger comprising a discreate set of code that connects the one or more robotic process automations of the software platform to the one or more available events registered to the one or more operations within the one or more external systems and is configured for executing the one or more robotic process automations when the registered event of the one or more available events is encountered.

11. The at least one processor configured to implement the trigger engine of claim 10, wherein the trigger engine pulls information from an element service of the one or more external systems regarding the one or more operations to acquire a list to track the one or more operations.

12. The at least one processor configured to implement the trigger engine of claim 10, wherein the registering of the one or more available events comprises making a list available for the one or more robotic process automations.

13. The at least one processor configured to implement the trigger engine of claim 10, wherein the at least one processor causes the trigger engine to:
create the trigger based on one or more user inputs according to connectors, connections, and robotic process automations configurations.

14. The at least one processor configured to implement the trigger engine of claim 10, wherein the at least one processor causes the trigger engine to:
execute at least one of the one or more robotic process automations based on the trigger.

15. The at least one processor configured to implement the trigger engine of claim 10, wherein the at least one processor causes the trigger engine to:
add at least one of the one or more robotic process automations to a queue based on the trigger.

16. The at least one processor configured to implement the trigger engine of claim 10, wherein the at least one processor causes the trigger engine to:
provide a notification prior to executing at least one of the one or more robotic process automations to a queue based on the trigger.

17. The at least one processor configured to implement the trigger engine of claim 10, wherein the trigger comprises a cloud trigger, and
wherein the one or more external systems comprises a cloud environment.

18. The at least one processor configured to implement the trigger engine of claim 10, wherein the at least one processor causes the trigger engine to:
schedule at least one of the one or more robotic process automations to execute based on the trigger.

* * * * *